United States Patent [19]

Ahn

[11] Patent Number: 5,537,154
[45] Date of Patent: Jul. 16, 1996

[54] EDGE COMPENSATION METHOD AND APPARATUS OF IMAGE SIGNAL

[75] Inventor: Byung-Eue Ahn, Seoul, Rep. of Korea

[73] Assignee: Samsung Electronics Co., Ltd., Kyungki-do, Rep. of Korea

[21] Appl. No.: 330,590

[22] Filed: Oct. 28, 1994

[30] Foreign Application Priority Data

Dec. 18, 1993 [KR] Rep. of Korea ............... 28424-1993

[51] Int. Cl.$^6$ .................................................. H04N 5/208
[52] U.S. Cl. ............................................ 348/629; 348/625
[58] Field of Search ........................... 348/629, 628, 348/625, 630, 631, 252, 253; H04N 5/208, 5/21

[56] References Cited

U.S. PATENT DOCUMENTS

| | | | |
|---|---|---|---|
| 4,351,003 | 9/1982 | Harlan | 348/629 |
| 4,683,496 | 7/1987 | Tom | 348/625 |
| 4,729,014 | 3/1988 | Flamm et al. | 348/630 |
| 4,823,190 | 4/1989 | Yamamoto | 348/625 |
| 4,839,836 | 6/1989 | Fonsalas | 348/630 |
| 4,962,419 | 10/1990 | Hibbard et al. | 348/629 |
| 4,982,179 | 1/1991 | Ogawa et al. | 348/660 |
| 5,220,428 | 6/1993 | Billing et al. | 348/625 |
| 5,251,018 | 10/1993 | Jang et al. | 348/253 |
| 5,285,267 | 2/1994 | Lim | 348/253 |
| 5,457,477 | 10/1995 | Wang et al. | 348/645 |

FOREIGN PATENT DOCUMENTS

| | | |
|---|---|---|
| 66267 | 3/1991 | Japan. |
| 3268684 | 11/1991 | Japan. |
| 4207670 | 7/1992 | Japan. |

*Primary Examiner*—Safet Metjahic
*Assistant Examiner*—Chris Grant
*Attorney, Agent, or Firm*—Sughrue, Mion, Zinn, Macpeak & Seas

[57] ABSTRACT

The present invention relates to a digital image signal processing method and apparatus, and more particularly, to an edge compensation method and apparatus of an image signal capable of improving the quality of an image in instruments performing a digital image signal process. An edge compensation method of a digital image signal processing system includes the steps of generating a luminance signal from a luminance matrix by receiving digital red, green and blue R, G and B image signals, generating a vertical edge signal in real-time by sequentially delaying the luminance signal in units of one horizontal line, generating a horizontal edge signal in real-time by sequentially delaying the luminance signal delayed in units of one horizontal line during a given time period, generating a composite image edge signal by adding the vertical edge signal to the horizontal edge signal, and outputting an edge-compensated luminance signal by adding the composite image edge signal to an uncompensated luminance signal.

12 Claims, 3 Drawing Sheets

EDGE COMPENSATION METHOD AND APPARATUS OF IMAGE SIGNAL

FIELD OF THE INVENTION

The present invention relates to a digital image signal processing method and apparatus. More particularly, it relates to an edge compensation method and apparatus for an image signal, capable of improving the quality of an image in instruments executing a digital image signal process.

BACKGROUND OF THE INVENTION

In general, broadcast instruments such as a video camera execute an edge compensation process for improving the definition of an image thereof. FIG. 1 shows a representative edge compensation circuit for processing an image signal. Red, green and blue (R, G and B) image signals are generated by a photoelectric converting element such as a charge-coupled device (CCD). Then, an edge compensation operation is respectively executed for the R, G and B image signals by the edge compensation circuit as shown in FIG. 1. In FIG. 1, a red edge compensator 20, a green edge compensator 10 and a blue compensator 40 are divided into horizontal and vertical edge compensator, respectively. The red and blue edge compensators 20 and 40 perform the edge compensation operation according to a vertical edge compensating signal output from the green edge compensator 10. In the edge compensating operation, a first 1H delayer 11 delays the G image signal input through a second input terminal P2 by 1H to output the delayed G image signal to a second 1H delayer 12. The second 1H delayer 12 further delays the G image signal by 1H to output a 2H-delayed G image signal. A second adder 13 adds the G image signal input from the second input terminal P2 to the 2H-delayed G image signal output from the second 1H delayer 12 to thereby output the added signal to a second amplifier 14. The second amplifier 14 amplifies the added signal output from the second adder 13 by a factor of 0.5. A third adder 15 adds the 1H-delayed G image signal from the first 1H delayer 11 to the amplified signal from the second amplifier 14 to thereby output the added signal as a vertical edge compensating signal. Further, a second delayer 31 delays the 1H delayed G image signal output from the first 1H delayer 11 during time period of t, and then outputs the delayed G image signal to a fourth amplifier 32. The fourth amplifier 32 amplifies the delayed G image signal by a factor of 2 and outputs the amplified signal to a fourth adder 34. Moreover, a second low pass filter LPF 33 filters the 1H-delayed G image signal output from the first 1H delayer 11, and outputs the filtered signal to the fourth adder 34. Here, the fourth adder 34 adds the added signal output from the third adder 15 to the amplified signal from the fourth amplifier 32 and to the G image signal low-pass-filtered by the second LPF 33, and outputs an edge-compensated G image signal to a fifth amplifier 52. The fifth amplifier 52 amplifies the edge-compensated G image signal from the fifth adder 52 by a factor of 0.59 and outputs the amplified signal to a sixth adder 54.

In the meanwhile, a first delayer 21 delays the R image signal input from a first input terminal P1 during the time period t, and outputs the delayed R image signal to a first amplifier 22. The first amplifier 22 amplifies the delayed R image signal by a factor of 2 and outputs the amplified signal to a first adder 24. Moreover, a first low pass filter LPF 23 filters the R image signal input from the first input terminal P1 to output the filtered signal to the first adder 24. Here, the first adder 24 adds the vertical edge-compensated G image signal output from the third adder 15 to the amplified R image signal output from the first amplifier 22 and to the R image signal low-pass-filtered by the first LPF 23, and outputs an edge-compensated R image signal to a second amplifier 51. The second amplifier 51 amplifies the edge-compensated R image signal from the first adder 24 by a factor of 0.3 and outputs the amplified signal to the sixth adder 54.

Further, a third delayer 41 delays the B image signal input from a third input terminal P3 during the time period t, and outputs the delayed B image signal to a sixth amplifier 42. The sixth amplifier 42 amplifies the delayed B image signal by a factor of 2, and outputs the amplified signal to a fifth adder 44. Moreover, a third low pass filter LPF 43 filters the B image signal received from the third input terminal P3, and outputs the filtered signal to the fifth adder 44. Here, the fifth adder 44 adds the vertical edge-compensated G image signal from the third adder 15 to the amplified B image signal from the sixth amplifier 42 and to the B image signal low-pass-filtered by the third LPF 43, and outputs an edge-compensated B image signal to a seventh amplifier 53. The seventh amplifier 53 amplifies the edge-compensated B image signal output from the fifth adder 44 by a factor of 0.11, and outputs the amplified signal to the sixth adder 54. The sixth adder adds the 0.3 R image signal amplified from the second amplifier 51 and the 0.59 G image signal amplified from the fifth amplifier 52 to the 0.11 B image signal amplified from the seventh amplifier 53, and outputs the added signal as a luminance signal Y.

The conventional edge compensation circuit, as discussed above, has a disadvantage in that a desired edge compensation value can not be obtained when the temperature changes the delay of the signal through the filters and adders, causing the edge compensation operation to be executed in a distorted state. In addition, the volume of the system becomes larger and the cost of production thereof becomes higher, because the PCB space is occupied by a plurality of manual elements included therein. Further, whenever the functional characteristics thereof are intended to be changed by embodying the above algorithm in a digital ASIC chip, there is a problem in that the ASIC design work must be repeated.

SUMMARY OF THE INVENTION

It is therefore one object of the present invention to provide an edge compensation apparatus and method for performing an accurate edge compensation without any distortion.

It is another object of the present invention to provide an edge compensation apparatus and method capable of improving the quality of an image by performing horizontal and vertical edge compensation for an input digital image signal.

It is yet another object of the present invention to provide an edge compensation apparatus and method capable of reducing the cost of production of a system by simplifying the hardware thereof.

According to a first aspect of the present invention, there is provided an edge compensation method. R, G and B image signals are input in response to the detection of a horizontal synchronization signal in order to rotate the image signals in units of one horizontal line. A luminance signal is generated in response to the inputs of the R, G and B image signals, and a vertical edge signal is generated from the luminance signal generated in the previous luminance signal generating process. Then, a horizontal edge signal is generated from the luminance signal generated in the luminance signal generating process. An edge compensation signal is then generated by adding the vertical edge signal to the horizontal edge signal for performing edge compensation on the luminance signal.

According to another aspect of the present invention, there is provided an edge compensation apparatus. An image signal input device receives R, G and B image signals in response to the detection of a horizontal synchronization signal and rotates the image signals in units of one horizontal line. A luminance signal generating device generates a luminance signal by receiving the R, G and B image signals from the image signal input device, and a vertical edge signal generating device generates a vertical edge signal from the luminance signal generated in the luminance signal generating device. A horizontal edge signal generating device generates a horizontal edge signal from the luminance signal generated in the luminance signal generating device. Then, an edge compensation device generates an edge compensation signal by adding the vertical edge signal to the horizontal edge signal to provide edge compensation of the luminance signal in real-time.

BRIEF DESCRIPTION OF DRAWING

A more complete appreciation of this invention, and many of the attendant advantages thereof, will be readily apparent as the same becomes better understood by reference to the following detailed description when considered in conjunction with the accompanying drawings. In the drawing like reference numerals are used among the drawings to indicate similar items, and wherein.

DETAILED DESCRIPTION OF THE PREFERRED EMBODIMENTS

Figure 1:
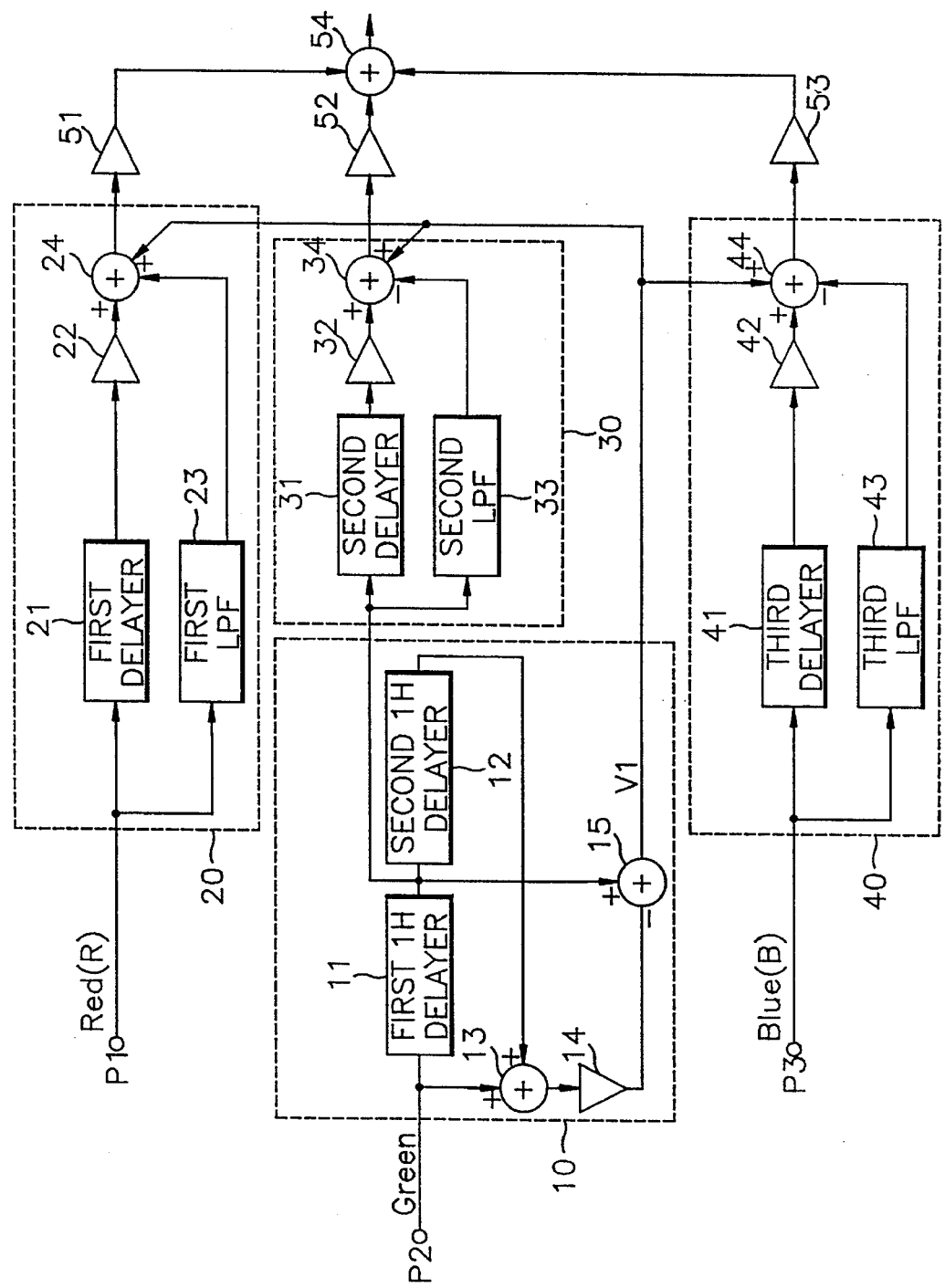
FIG. 1 is a block diagram showing a representative edge compensation circuit.
Figure 2:
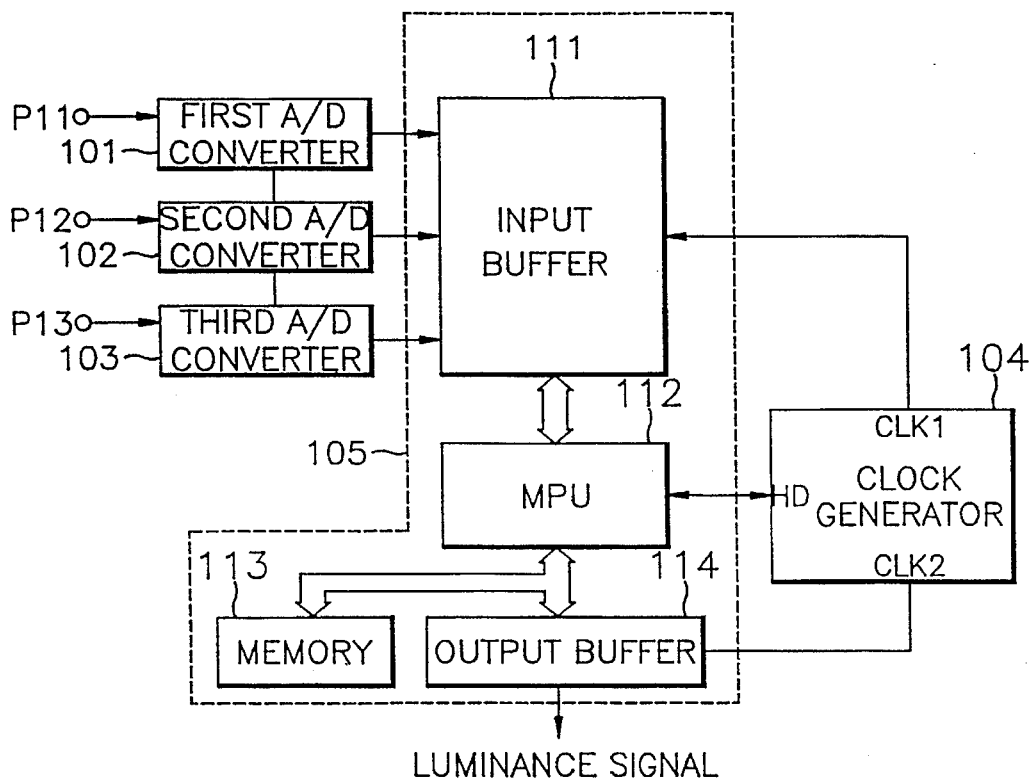
FIG. 2 is a block diagram showing an edge compensation circuit of an image signal according to an embodiment of the present invention.

FIG. 2 shows an embodiment of an edge compensation circuit according to the present invention. The edge compensation circuit includes, first, second and third analog/digital converters 101–103 for converting input R, G and B analog image signals into R, G and B digital image signals, respectively. Further, it includes a clock generator 104 for generating a first clock signal CLK1 which receives a horizontal synchronization signal and an image signal and also for generating a second clock signal CLK2 which produces the image signal. Further still, the circuit includes a digital signal processor DSP 105 for executing an edge compensation operation on the R, G and B image signals according to the horizontal synchronization signal received from the clock generator 104. The DSP 105 sequentially receives the digital image signals, converted by the first to third A/D converters 101–103, in accordance with the first clock signal CLK1 generated from the clock generator 104, to thereby output edge-compensated image signals in accordance with a second clock signal CLK2. The DSP 105 comprises an input buffer 111 which receives the digital image signals converted by the first to third A/D converters 101–103 according to the first clock signal CLK1 generated from the clock generator 104, a memory 113 for temporarily storing a program which compensates the edges of the image signals and for storing data generated during edge compensation process, a microprocessing unit MPU 112 for executing the edge compensation of the R, G and B image signals output from the input buffer 111 to output the edge-compensated luminance signal, and an output buffer 114 for outputting the edge-compensated luminance signal from the MPU 112 according to the second clock signal CLK2 generated by the clock generator 104.

Figure 3:
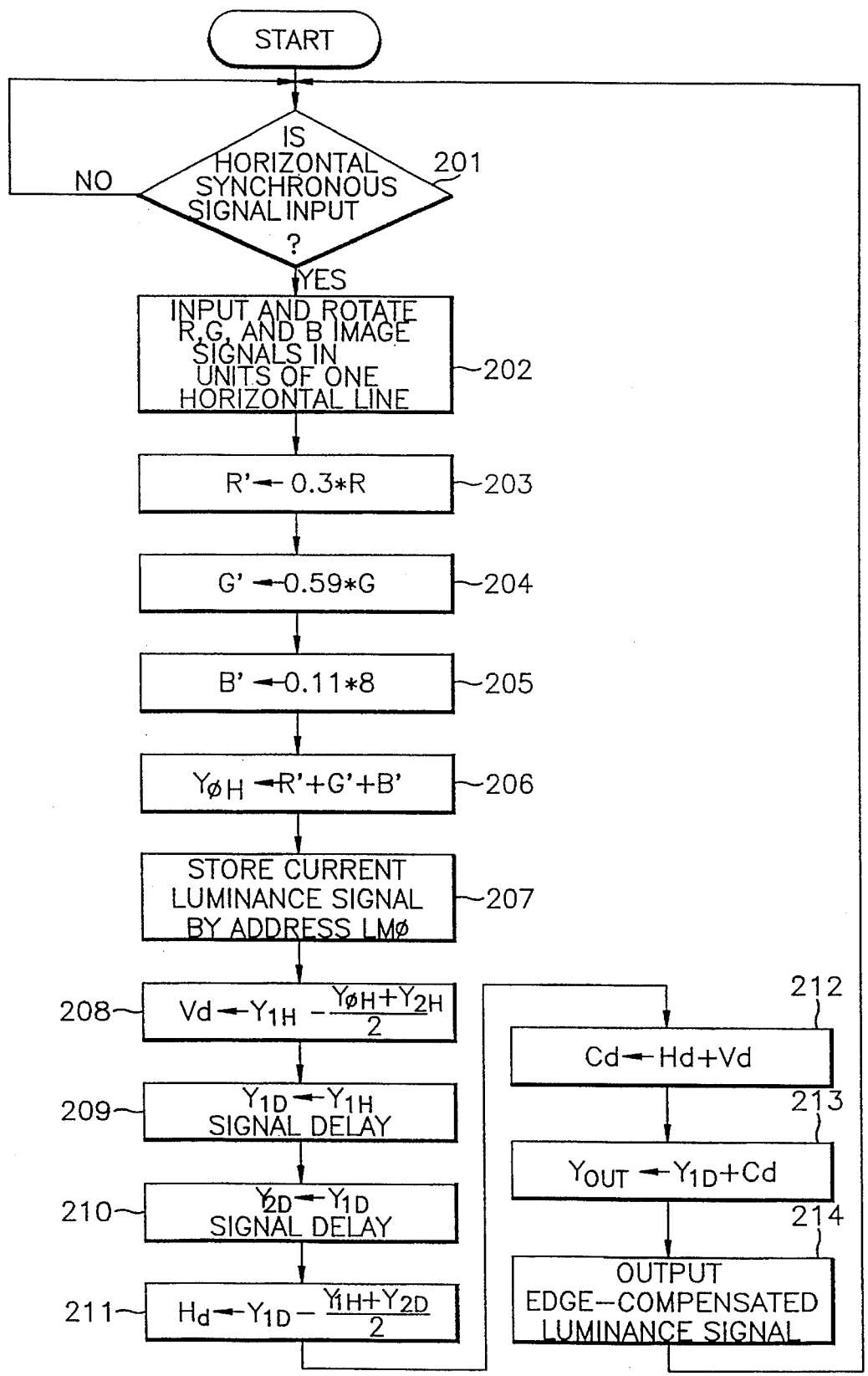
FIG. 3 is a flow chart showing an edge compensation control process according to the present invention.

FIG. 3 is a flow chart showing an edge compensation control process according to the present invention, which includes the steps of receiving the R, G and B image signals in response to the detection of the horizontal synchronization signal, generating the luminance signal by receiving the R, G and B image signals, generating the vertical edge signal from the luminance signal generated in the previous luminance signal generating step, generating the horizontal edge signal from the luminance signal generated in the luminance signal generating step, and generating the edge compensation signal by adding the vertical edge signal to the horizontal edge signal to execute in real-time the edge compensation of the luminance signal.

Figure 4A:
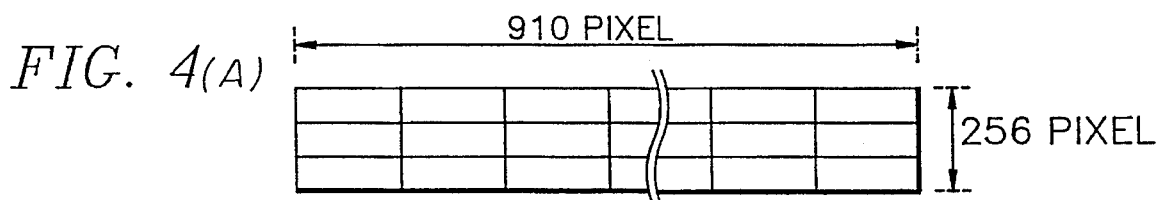
FIGS. 4a to 4c are memory maps showing constructions according to the present invention.
Figure 4B:
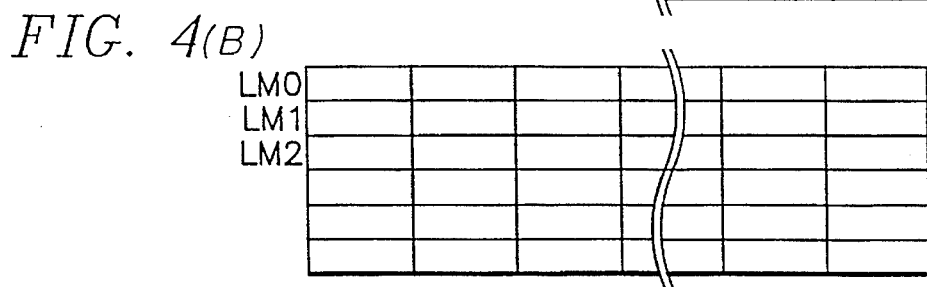
Figure 4C:
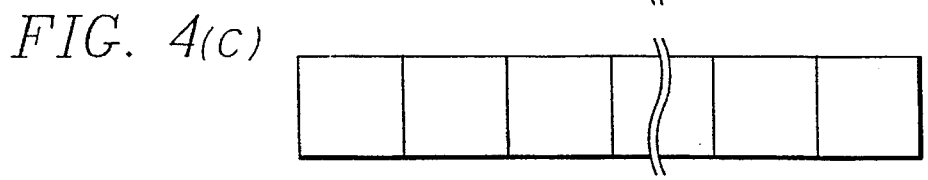

FIGS. 4a to 4c are memory maps showing memory constructions according to the present invention.

FIG. 4a shows a memory map of the input buffer 111, FIG. 4b for rotating the image signals, and FIG. 4c shows a memory map of the output buffer 114 for outputting the edge-compensated luminance signal.

A preferred embodiment of the present invention is hereinafter described with reference to FIGS. 2 to 4.

The first, second and third analog/digital converters 101–103 respectively convert the R, G and B analog image signals received from the first, second and third input terminals P11–P13 into R, G and B digital image signals, and output the R, G and B digital image signals. The clock generator 104 generates the first clock signal CLK1 used for receiving the horizontal synchronization signal and the image signals, and also generates the second clock signal CLK2 used for outputting the image signal. The digital signal processor DSP 105 receives the digital image signals converted by the first to third A/D converters 101–103, according to the first clock signal CLK1 and sequentially inputs the R, G and B image signals of one horizontal line of the image to the input buffer 111. Where the input buffer 111 is constructed as a line memory, as shown in FIG. 4a, where LM0 indicates line memory 0 for storing one horizontal line of the image signal.

At this time, in step 201, MPU 112 installed in the DSP 105 checks whether the horizontal synchronization signal from the clock generator 104 is received and if received, it proceeds to step 202. In step 202, MPU 112 reads the R, G and B image signals stored in input buffer 111 and executes a rotation operation on the luminance data stored in the memory shown in FIG. 4b in units of a single horizontal line. Here, the term "rotation" means the operation in which data is transferred from address LM0 to address LM1, and from LM1 to LM2, and so forth. The effect of performing a rotation operation is to sequentially delay the image data by a time corresponding to one horizontal line. Next, it proceeds to step 203, in which MPU 112 generates an R' image signal by multiplying the R image signal by 0.3 and proceeds to step 204. In step 204, MPU 112 generates a G' image signal by multiplying the G image signal by 0.59 and proceeds to step 205. In step 205, MPU 112 generates a B' image signal by multiplying the B image signal by 0.11 and proceeds to step 206. In step 206, MPU 112 adds the generated R' G' and B' image signals, as shown in equation (1), and generates a current luminance signal $Y_{OH}$. Then, it proceeds to step 207.

$$Y_{OH} = 0.3 R + 0.59 G + 0.11 B \quad (1)$$

In step 207, MPU 112 stores the current luminance signal $Y_{OH}$ into address LM0 of the memory shown in FIG. 4b. Sequentially, in step 208, MPU 112 uses address LM0 storing the current luminance signal $Y_{OH}$, the address LM1 storing a luminance signal $Y_{1H}$ delayed by one horizontal line, and the address LM2 storing a luminance signal $Y_{2H}$ delayed by two horizontal lines, to generate a vertical edge signal $V_d$ as shown in equation (2).

$$V_d = Y_{1H} - \frac{Y_{0H} + Y_{2H}}{2} \quad (2)$$

Thereafter, in step 209, MPU 112 again delays the data that has already been delayed by one horizontal line and stored in address LM1, by 30 ns to 270 ns and generates an uncompensated luminance signal $Y_{1D}$. Then, it proceeds to step 210. In step 210, MPU 112 delays the uncompensated luminance signal $Y_{1D}$ by another predetermined time period, for example by 30 ns to 270 ns, to generate a delayed luminance signal $Y_{2D}$. Next, it proceeds to step 211, in which MPU 112 uses the uncompensated luminance signals $Y_{1D}$ and $Y_{2D}$ and a luminance signal $Y_{1H}$ delayed by one horizontal line stored in the address LM1, to generate a horizontal edge signal $H_d$, as shown in equation (3).

$$H_d = Y_{1D} - \frac{Y_{1H} + Y_{2D}}{2} \quad (3)$$

In step 212, MPU 112 adds the vertical edge signal $V_d$ to the horizontal edge signal $H_d$, as shown in equation (4), and generates a composite video edge signal $C_d$.

$$C_d = V_d + H_d \quad (4)$$

In step 213, MPU 112 adds the uncompensated luminance signal $Y_{1D}$ to the composite video edge signal $C_d$ to generate the edge-compensated luminance signal $Y_{OUT}$ and stores the signal $Y_{OUT}$ into the memory 113. Next, it proceeds to step 214. In step 214, since MPU 112 applies a control signal to the clock generator 104, the second clock signal CLK2 generated therefrom is applied to output buffer 114. As a result, the output buffer 114 outputs the edge-compensated luminance signal $Y_{OUT}$. Then, it returns to step 201 to repeat the edge compensation operations set forth above.

As explained above, a digital image signal processing method and apparatus according to the present invention is provided in which fluctuations due to changes over time and in temperature do not occur, and in which the cost of production can be reduced, since the number of components thereof are decreased. Further, a digital image signal processing method and apparatus according to the present invention are provided in which distortion phenomenon of image quality due to noise does not occur. Such a reduction in distortion being adequate for a high quality image signal processing system, thereby reducing the requirements of hardware resources and improving the image quality.

What is claimed is:

1. An edge compensation method for a digital image signal processing system, said method comprising the steps of:

generating a digital luminance signal from a luminance matrix by receiving digital red (R), green (G) and blue (B) image signals comprised of horizontal lines and storing said digital luminance signal in a memory;

generating a digital vertical edge signal in real-time by sequentially delaying said digital luminance signal in units of one horizontal line by transferring said digital luminance data to another location in the memory;

generating a digital horizontal edge signal in real-time by sequentially digital delaying said digital luminance signal delayed in units of one horizontal line during a predetermined time period by transferring said digital luminance data to another location in the memory;

generating a composite image edge signal by adding said digital vertical edge signal to said digital horizontal edge signal; and outputting an edge-compensated luminance signal by adding said composite image edge signal to the uncompensated digital luminance signal.

2. An edge compensation method for a digital image signal processing system, said method comprising the steps of:

receiving red (R), green (G) and blue (B) image signals in response to detection of a horizontal synchronization signal and delaying digital image signals previously stored in a memory in units of one horizontal line by transferring them from one location in the memory to another;

generating a digital luminance signal based on the received digital R, G and B image signals and storing said digital luminance signal in said memory;

generating a vertical edge signal from said digital luminance signal generated in said digital luminance signal generating step;

generating a horizontal edge signal from said digital luminance signal generated in said digital luminance signal generating step; and generating an edge compensation signal by adding said vertical edge signal to said horizontal edge signal for performing edge compensation of said digital luminance signal.

3. The method defined by claim 2, wherein said vertical edge signal generating step is comprised of the step of:

generating said vertical edge signal by subtracting a mean value from a digital luminance signal delayed by one horizontal line, wherein said mean value is generated based on said digital luminance signal and another digital luminance signal delayed by an amount corresponding to two horizonal lines by transferring the other digital luminance signal to another location in the memory.

4. The method defined by claim 2, wherein said horizontal edge signal generating step comprises the steps of:

generating an uncompensated digital luminance signal by delaying a digital luminance signal delayed by one horizontal line for a first time period;

generating a delayed digital luminance signal delaying said uncompensated digital luminance signal for a second time period; and generating said horizontal edge signal by subtracting a mean value from said uncompensated digital luminance signal, wherein said mean value is generated based on said digital luminance signal delayed by one horizontal line and said delayed digital. luminance signal.

5. The method defined in claim 4, wherein said first and second time periods are each within the range of 30 ns to 270 ns.

6. An edge compensation apparatus for a digital image signal processing system, said apparatus comprising:

a memory:

image signal input means for inputting digital red (R), green (G) and blue (B) image signals in response to the detection of a horizontal synchronization signal and transferring previously stored image signals in units of one horizontal line to another location in the memory;

luminance signal generating means for generating a digital luminance signal based on the R, G and B image signals and storing said digital luminance signal in the memory;

vertical edge signal generating means for generating a vertical edge signal from said digital luminance signal;

horizontal edge signal generating means for generating a horizontal edge signal from said digital luminance signal; and edge compensation means for generating an edge compensation signal by adding said vertical edge signal to said horizontal edge signal for executing edge compensation of said digital luminance signal.

7. The apparatus defined by claim 6, wherein said vertical edge generating means is comprised of:

means for generating said vertical edge signal by subtracting a mean value from a digital luminance signal delayed by one horizontal line, and generating said mean value from a digital luminance signal delayed by two horizontal lines and said digital luminance signal, wherein the digital luminance signals are delayed by transferring them from one location in the memory to another.

8. The apparatus defined by claims 6, wherein said horizontal edge generating means is comprised of:

means for generating an uncompensated digital luminance signal by delaying a luminance signal delayed by one horizontal line for a first time period;

means for generating a delayed digital luminance signal by delaying said uncompensated digital luminance signal during a second time period; and means for generating said horizontal edge signal by subtracting a mean value from said uncompensated digital luminance signal, and generating said mean value from said digital luminance signal delayed by one horizontal line and said delayed digital luminance signal.

9. The apparatus defined by claims 7, wherein said horizontal edge generating means is comprised of:

means for generating an uncompensated digital luminance signal by delaying a digital luminance signal delayed by one horizontal line for a first time period;

means for generating a delayed digital luminance signal by delaying said uncompensated luminance signal during a second time period; and means for generating said horizontal edge signal by subtracting a mean value from said digital uncompensated luminance signal, and generating said mean value from said digital luminance signal delayed by one horizontal line and said delayed digital luminance signal.

10. The apparatus defined in claim 8, wherein said first and second time periods are each within the range of 30 ns to 270 ns.

11. The apparatus defined in claim 9, wherein said first and second time periods are each within the range of 30 ns to 270 ns.

12. An edge compensation apparatus for a digital image signal processing system, said apparatus comprising:

a clock generator for generating a first clock signal, which receives a horizontal synchronization signal and an image signal, and generating a second clock signal which produces the image signal;

an input buffer for inputting a digital-converted image signal according to said first clock signal;

a memory for temporarily storing a program for executing a process for compensating an edge of said image signal, and storing data generated during the edge compensation process;

processing means, connected to said memory, for executing, according to the program stored in said memory, the edge compensation process on R, G and B image signals of said image signal, output from said input buffer to output an edge-compensated luminance signal; and an output buffer for outputting said edge-compensated luminance signal from said processing means according to said second clock signal.

* * * * *